United States Patent [19]

Deis

[11] Patent Number: 5,027,335

[45] Date of Patent: Jun. 25, 1991

[54] READ APPARATUS HAVING VERTICAL TURRET MAGAZINE FOR INFORMATION DISCS

[75] Inventor: August A. Deis, Siegen, Fed. Rep. of Germany

[73] Assignee: U.S. Philips Corporation, New York, N.Y.

[21] Appl. No.: 235,146

[22] Filed: May 11, 1988

[30] Foreign Application Priority Data

May 13, 1987 [DE] Fed. Rep. of Germany ....... 3715942

[51] Int. Cl.$^5$ ............................................. G11B 17/22
[52] U.S. Cl. ........................................ 369/37; 369/39
[58] Field of Search ................. 369/37, 178, 191, 192, 369/194, 195, 199

[56] References Cited

U.S. PATENT DOCUMENTS

| | | | |
|---|---|---|---|
| 1,799,148 | 4/1931 | Bryant | 369/192 |
| 2,952,463 | 9/1960 | Vanderzee | 369/37 |
| 4,344,162 | 8/1982 | Foufounis | 369/37 |
| 4,580,254 | 4/1986 | Hojyo et al. | 369/34 X |
| 4,754,445 | 6/1988 | Young et al. | 369/37 |
| 4,791,626 | 12/1988 | Staar | 369/37 |
| 4,826,019 | 5/1989 | Kondo et al. | 369/58 X |

FOREIGN PATENT DOCUMENTS

| | | | |
|---|---|---|---|
| 695202 | 9/1964 | Canada | 369/37 |
| 8707423 | 12/1987 | World Int. Prop. O. | 369/37 |

Primary Examiner—Stuart S. Levy
Assistant Examiner—Kenneth B. Wells
Attorney, Agent, or Firm—David R. Treacy

[57] ABSTRACT

Read apparatus for optical discs has a turret magazine rotatable in a vertical plane, and a disc-drive arrangement surrounded by the turret magazine so that a disc received from the magazine is rotatable in a vertical plane which extends substantially parallel to the supporting plane of storage compartments situated underneath and above the plane of rotation. A feed-in device includes a loading funnel and an unloading funnel arranged respectively above and underneath a receiving compartment of the disc-drive arrangement, each storage compartment has an associated releasable holding device for the discs, and the receiving compartment of the disc-drive arrangement has an associated releasable holding device for a disc received from the magazine.

4 Claims, 1 Drawing Sheet

READ APPARATUS HAVING VERTICAL TURRET MAGAZINE FOR INFORMATION DISCS

BACKGROUND OF THE INVENTION

The invention relates to a read apparatus having a rotatable turret magazine with a plurality of disc storage compartments equidistantly spaced along its circumference. A feed-in device conveys a disc from a storage compartment into the disc-drive arrangement and back into a storage compartment, and a scanning device reads the information stored on a disc which is rotated by the disc-drive arrangement. Such an apparatus is known from DE-A20 43 289, which describes a jukebox for playing audio records.

In documentation processing very large information stores are needed. Currently, the most suitable information medium is the optical disc, from which the information can be read optically. In order to obtain large storage units a plurality of such optical discs with their cartridges are placed in suitable compartments of a bulk storage system.

An access mechanism grips a disc to be processed and loads it into a processing device (drive) of known type. In known bulk storage systems of this type the cartridge is also driven. The stored discs are arranged in one plane. This results in expensive constructions and long access times.

SUMMARY OF THE INVENTION

It is the object of the invention to simplify a read apparatus for use in conjunction with optical storage discs, and to enable the information stored on the discs to be retrieved rapidly.

The turret magazine is rotatable in a vertical plane, and the disc-drive arrangement is surrounded by the turret magazine so that a disc received from the magazine is rotatable in a vertical plane which extends substantially perpendicular to the vertical plane of rotation of the magazine whose storage compartments a situated underneath and above the axis of rotation. The feed-in device essentially comprises a loading funnel and an unloading funnel arranged respectively above and underneath a receiving compartment of the disc-drive arrangement, each storage compartment has an associated releasable holding device for the discs, and the receiving compartment of the disc-drive arrangement has an associated releasable holding device for a disc received from the magazine.

For the removal of a disc from an upper holder compartment and for returning it into a lower storage compartment no drive means are needed, because this is achieved by gravity. The disc to be removed from a storage compartment is brought into a position straight above the receiving compartment of the disc-drive arrangement. From this position the disc falls directly into the receiving compartment via a loading funnel, which is a stationary guide for the disc, after the release of the holding device.

After the information has been read the holding device of the disc drive arrangement is released, so that the disc can fall into a storage compartment situated underneath the disc drive means via an unloading funnel which is a stationary guide directing the disc into the storage compartment.

An even simpler construction is obtained in an embodiment of the invention in which the disc-drive arrangement is constructed in such a way that information stored on opposite sides of a disc can be read without reversing the disc.. In this way the time needed for a mechanical reversal is saved. In a preferred embodiment two disc-drive arrangements each comprising a scanning device are juxtaposed in mirror-inverted relationship in such a way that a receiving compartment for a disc which falls out of a storage compartment is formed between said arrangements.

In order to enable the storage compartments to be loaded from the exterior at least one of the storage compartments has an externally accessible loading aperture for inserting or removing a disc. Each storage compartment may have such a loading aperture, so that each compartment can be loaded directly. If only one storage compartment with an externally accessible loading aperture has been provided the other storage compartments must be loaded via the compartment which can be opened and via the disc-drive arrangement, which is a detour.

The read apparatus in accordance with the invention is particularly suitable for use in conjunction with optically readable information discs. Various constructions and drives enabling discs of an arbitrary type (optically, magnetically or mechanically readable) to be gripped and centred are well known to those skilled in the art.

DETAILED DESCRIPTION OF THE PREFERRED EMBODIMENT

Figure 2:
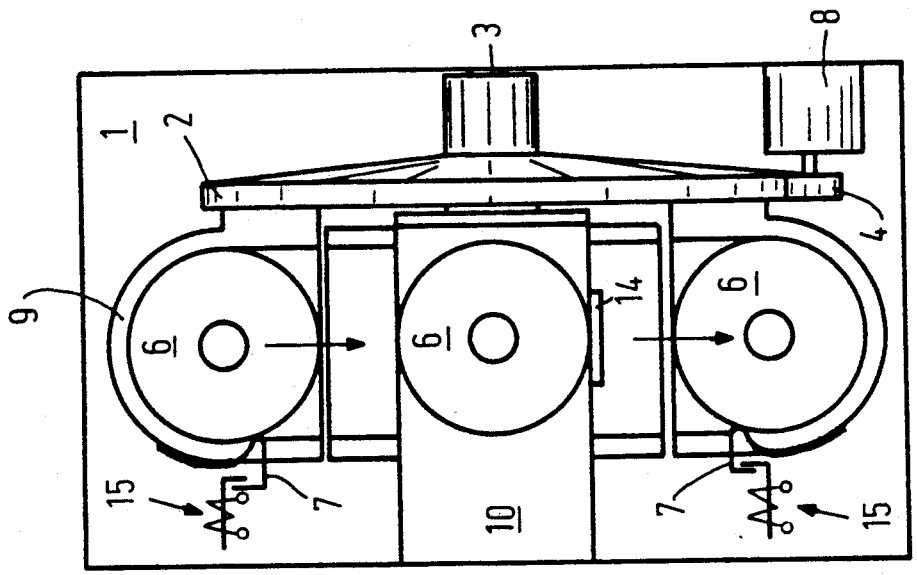
FIG. 2 is a side sectional elevation view of the apparatus shown in FIG. 1.
Figure 1:
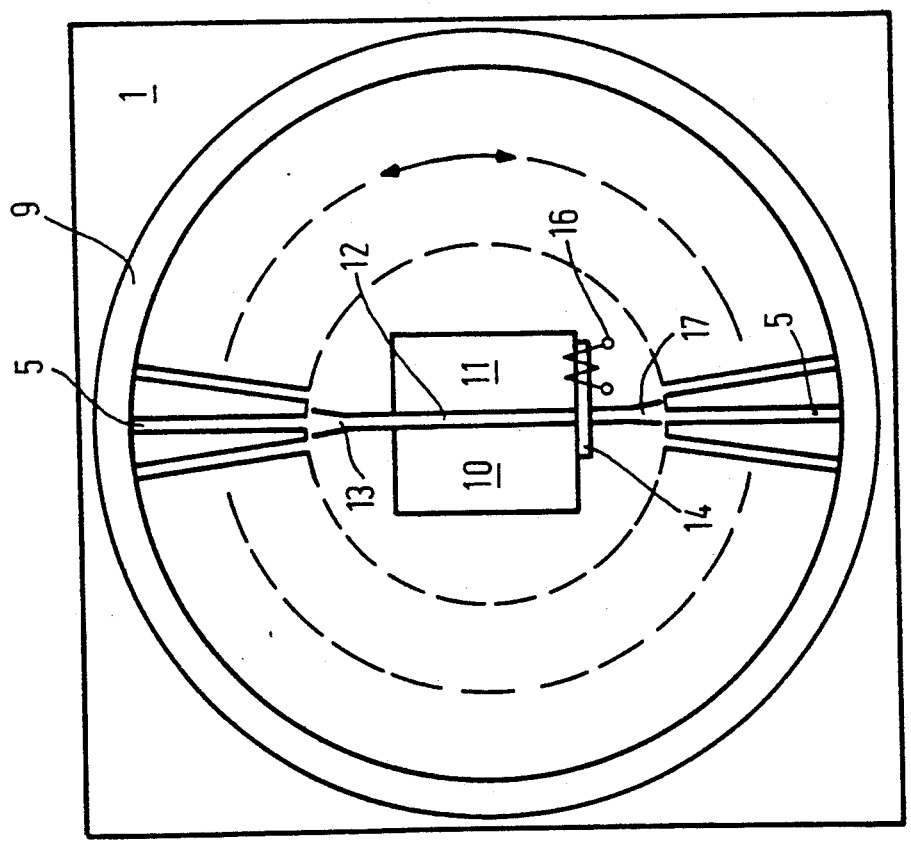
FIG. 1 is a cross-sectional elevation view of of a read apparatus in accordance with the invention.

A turret magazine is vertically rotatable inside the housing 1. It comprises a carrier wheel 2 with a supporting ring 9 of semicircular cross-section which is rotatable about an axis of rotation through the shaft 3 via the pinion 4 of the drive motor 8, and a plurality of storage compartments 5 supported on the inner circumferential surface of the supporting ring 9.

Discs 6 are held in the storage compartments 5 by means of clamping members 7 in planes which are preferably perpendicular to the plane of rotation of the turret magazine and in a very simple embodiment extend through the shaft 3.

Identical disc-drive arrangements 10 and 11 are arranged mirror-symmetrically relative to one another inside the circular array of storage compartments, so that between said arrangements a receiving compartment 12 is formed into which a disc 6 from a storage compartment 5 above the receiving compartment can fall via the loading funnel 13 onto a partition 14 if the corresponding clamping member 7 is released by the electrically actuated magnetic armature 15.

Depending on the disc side whose information content is to be read the disc 6 is rotated by one of the drive arrangements 10 or 11 to enable the information content to be read by means of suitable optical scanning devices, not shown. Subsequently, the partition 14 is withdrawn by actuation of the magnet coil 16, so that the disc 6 can fall into the free storage compartment 5 situated underneath the unloading funnel 17.

The rotary movement of the turret magazine and the release means for the storage compartments 5 and the receiving compartment 12 can be controlled manually. However, preferably control is effected automatically by means of an appropriate program. The control method falls beyond the scope of the invention and is therefore not described.

The storage compartments 5 can be loaded with discs 6 via one or more openings, not shown, in the supporting ring 9, which openings can be closed.

What is claimed is:

1. A read apparatus for information stored on a plurality of information discs, comprising
    a turret magazine rotatable about an axis of rotation and comprising a plurality of storage compartments which are equidistantly spaced along its circumference and are adapted to hold the information discs,
    a disc-drive arrangement for rotating a disc selected from the turret magazine,
    a feed-in device for conveying a disc from a storage compartment into the disc-drive arrangement and back into a storage compartment, and
    a scanning device for reading the information stored on a disc which is rotated by the disc-drive arrangement, characterized in that
    the turret magazine is rotatable in a first vertical plane,
    the disc-drive arrangement is surrounded by the turret magazine in such a way that a disc received from said magazine is rotatable in a second vertical plane which extends substantially perpendicular to the first vertical plane and storage compartments are situated underneath and above said axis of rotation,
    the feed-in device essentially comprises a loading funnel and an unloading funnel arranged respectively above and underneath a receiving compartment of the disc-drive arrangement, each funnel guiding the disc while being conveyed, each storage compartment has an associated releasable holding device for the discs, and
    the receiving compartment of the disc-drive arrangement has an associated releasable holding device for a disc received from the magazine.

2. An apparatus as claimed in claim 1, characterized in that the disc-drive arrangement is constructed in such a way that information stored on the opposite sides of a disc can be read without reversing the disc.

3. An apparatus as claimed in claim 2, characterized in that two disc-drive arrangements each comprising a scanning device are juxtaposed in mirror-inverted relationship in such a way that a receiving compartment for a disc which falls out a storage compartment is formed between said arrangements.

4. An apparatus as claimed in claim 1, characterized in that at least one of the storage compartments has an externally accessible loading aperture for inserting or removing a disc.

* * * * *